United States Patent [19]

Barbe

[11] Patent Number: 5,195,326
[45] Date of Patent: Mar. 23, 1993

[54] PROCESS FOR PROVIDING A CONTROLLED ATMOSPHERE INSIDE AN ENCLOSURE AND HAVING A CONTROLLED ATMOSPHERE

[75] Inventor: Christian Barbe, Fontenay-aux-Roses, France

[73] Assignee: L'Air Liquide, Societe Anonyme pour l'Etude et l'Exploitation des Procedes Georges Claude, Paris, France

[21] Appl. No.: 824,918

[22] Filed: Jan. 22, 1992

[30] Foreign Application Priority Data

Feb. 14, 1991 [FR] France ................... 91 01739

[51] Int. Cl.⁵ ............................................. F24F 3/16
[52] U.S. Cl. ................................... 62/78; 62/440
[58] Field of Search ............................ 62/78, 440

[56] References Cited

U.S. PATENT DOCUMENTS 4,976,109  12/1990  Garrett ................................ 62/78
5,063,753  11/1991  Woodruff ........................... 62/78

FOREIGN PATENT DOCUMENTS 0315309  5/1989  European Pat. Off. .
0358359  3/1990  European Pat. Off. .
0368678  5/1990  European Pat. Off. .
2521402  8/1983  France .

Primary Examiner—Ronald C. Capossela
Attorney, Agent, or Firm—Young & Thompson

[57] ABSTRACT

A gas under pressue is sent to a first compartment of a separation module having permeation membrane, the first modified gas mixture which exits from the first compartment being introduced into the enclosure to constitute therein a controlled atmosphere which is removed and circulated in counter-current in the second compartment of the module towards the discharge orifice of the latter so as to substantially recombine the two gaseous modified mixtues before discharging same thereby increasing the performances of the separation module.

13 Claims, 1 Drawing Sheet

PROCESS FOR PROVIDING A CONTROLLED ATMOSPHERE INSIDE AN ENCLOSURE AND HAVING A CONTROLLED ATMOSPHERE

BACKGROUND OF INVENTION 1. a) Field of the Invention

The present invention concerns a process for preparing a controlled atmosphere inside an enclosure and an enclosure for carrying out this process.

More particularly, the invention concerns a process for providing, within an enclosure, a controlled atmosphere, of the type comprising the steps of supplying a gaseous mixture under pressure to a first compartment of a membrane type separation module, circulating through the enclosure a first one of the modified gaseous mixtures from the module to constitute the controlled atmosphere, and recombining the controlled atmosphere withdrawn from the enclosure with the second of the modified mixtures emanating from the module before rejection into the surrounding atmosphere.

2. a) Description of Prior Art

Such a process is described in the document EP-A-0.358.359, recombination being carried out in the duct for the evacuation of the residual gas from the adsorbent or membrane type separation module.

OBJECT OF INVENTION

It is an object of the present invention to propose an improved process enabling to improve the operation and the yield of the membrane type separation module, for example by reducing the useful surface of the membrane and the flow of gaseous mixture under pressure, thereby reducing congestion in the module and its manufacturing cost, and enabling to more easily integrate same in or on the enclosures.

SUMMARY OF THE INVENTION

For this purpose, according to a characteristic of the invention, the recombination is carried out in the second compartment of the module, typically in the low pressure compartment, the first modified mixture, which is introduced into the enclosure, being expanded at a pressure which is slightly higher than the pressure within the low pressure compartment of the module, the controlled atmosphere, from the enclosure, being circulated in the low pressure compartment in countercurrent with the gaseous flow from the high pressure compartment of the module.

It is also an object of the present invention to provide an enclosure structure which is associated with a membrane type separation module in a compact arrangement and of low manufacturing and assembling cost.

For this purpose, according to another characteristic of the invention, such an enclosure, of the type comprising at least one interior volume connected, by means of a first duct, to a first compartment of a membrane type separation module which can be connected to a source of a gaseous mixture under pressure, and, by means of a second duct, to an orifice for the discharge into ambient atmosphere communicating with a second compartment of the module, is characterized in that the second duct consists at least partially of the second compartment of the module.

The process and the enclosure according to the invention are useful for protection against oxidation or some contamination of raw materials, for example food products, semi-finished products, during their manufacture, or finished products, for a period of time which varies before transformation or marketing, for example, in the secondary electronic industry.

BRIEF DESCRIPTION OF DRAWINGS

Other characteristics and advantages of the present invention will appear from the description which follows of embodiments, given by way of illustration, but without limitations, with reference to the annexed drawing, in which.

DESCRIPTION OF PREFERRED EMBODIMENTS

Figure 1:
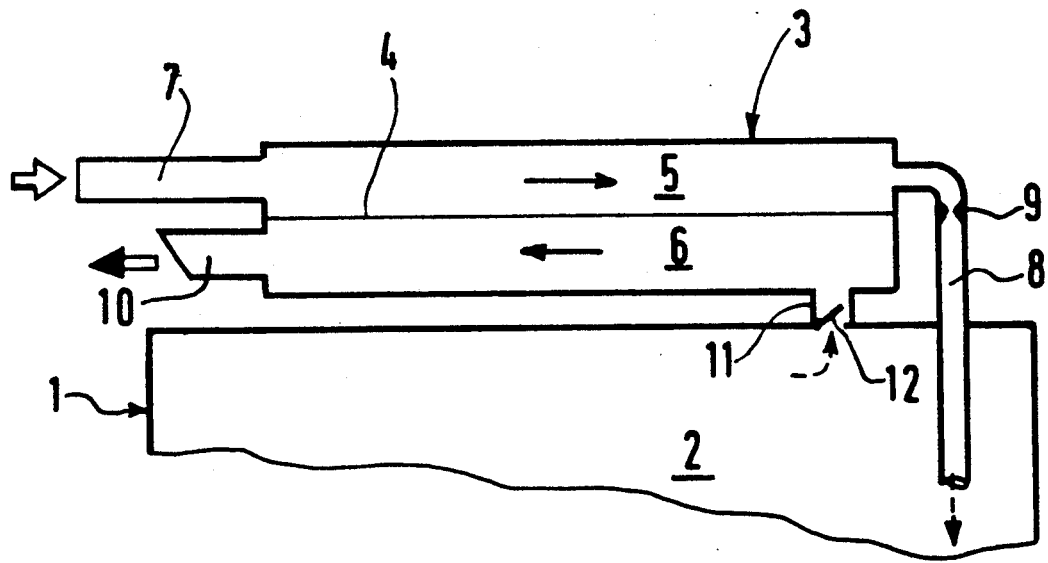
FIG. 1 is a schematic view in cross-section of a first embodiment of the invention.

In the description which follows and in the drawing, identical or similar elements are referred to by the same reference numerals.

FIG. 1 illustrates a portion of a substantially impervious enclosure 1, defining at least an interior volume 2, associated with a module for separation by permeation 3, comprising at least one permeation membrane 4 separating an upstream or high pressure compartment 5 from a downstream or low pressure compartment 6. Module 3 includes, at a first end, a terminal 7 for connection to a source of gaseous mixture under pressure, typically a network for supplying industrial compressed air at a pressure between 2.5 and $6 \times 10^5$ Pa, opening in the high pressure compartment 5 and, at the other end, a duct 8 in communication with the high pressure compartment 5 and extending inside the volume 2. Duct 8 is provided with a throat 9 to reduce the pressure of the modified gaseous mixture from the high pressure compartment 5 of module 3 and which is introduced into the volume 2 at a slightly higher pressure than that of the low pressure compartment 6. The latter communicates, on the side of the first end of the module 3, with a duct 10 for discharge into the surrounding atmosphere and, in the vicinity of the second end of the module 3, with a duct portion 11 in communication with the upper part of volume 2 and provided with a trap valve 12.

With this arrangement, the first modified gaseous mixture, typically a mixture for providing inertness and which is poor in oxygen and consists essentially of nitrogen, which is introduced into the volume 2 of enclosure 1 to constitute therein a controlled atmosphere, escapes from the latter, slightly modified in its composition by the products which are present in the enclosure, through duct 11 and high pressure chamber 6 in counter-current to the gaseous flow which circulates in the high pressure chamber 5. The introduction of the mixture to provide inertness and which is poor in oxygen, into low pressure chamber 6 lowers the partial pressure of oxygen in the latter, which thus enables to substantially improve the operation of the membrane. By way of example for a membrane whose oxygen/nitrogen selectivity is 3;4, and which is made of polyimide, flushing of low pressure compartment 6 with the total gas for providing inertness condition which is produced and has circulated through volume 3 enables, for a same production of this gas for providing inertness, at the same purity of about 99%, to reduce the required membrane surface by about 25% and the necessary flow of compressed air by about 20%. The gaseous mixture which is withdrawn by discharge duct 10 has a composition which is essentially identical to that (air) introduced into connection 7, with an oxygen content of about 21%, which thus removes the risk which could be due, without recombination, to an over-oxygenation of the area surrounding the enclosure, for example a fire, or a rejection of too much gas for providing inertness, for example anoxia.

With such an arrangement, the separation module 3 enables on the other hand a recycling of the vapors or scents which are released by the products which are stored in enclosure 1. On the other hand, if enclosure 1 is maintained at a temperature (hot or cold) which is different from room temperature, module 3 permits a function of heat exchange between the injected gaseous mixture and the mixture which is extracted from the enclosure, which enables to reduce the energy consumption of the storage assembly.

In practice, the interior volume 2 of enclosure 1 is kept at a low pressure and the fact that the first modified gaseous mixture, typically one for providing inertness, issued from the high pressure compartment of the separation module, is utilized at a pressure only slightly above atmosphere pressure enables to substantially simplify the construction of the membrane type module.

Figure 2:
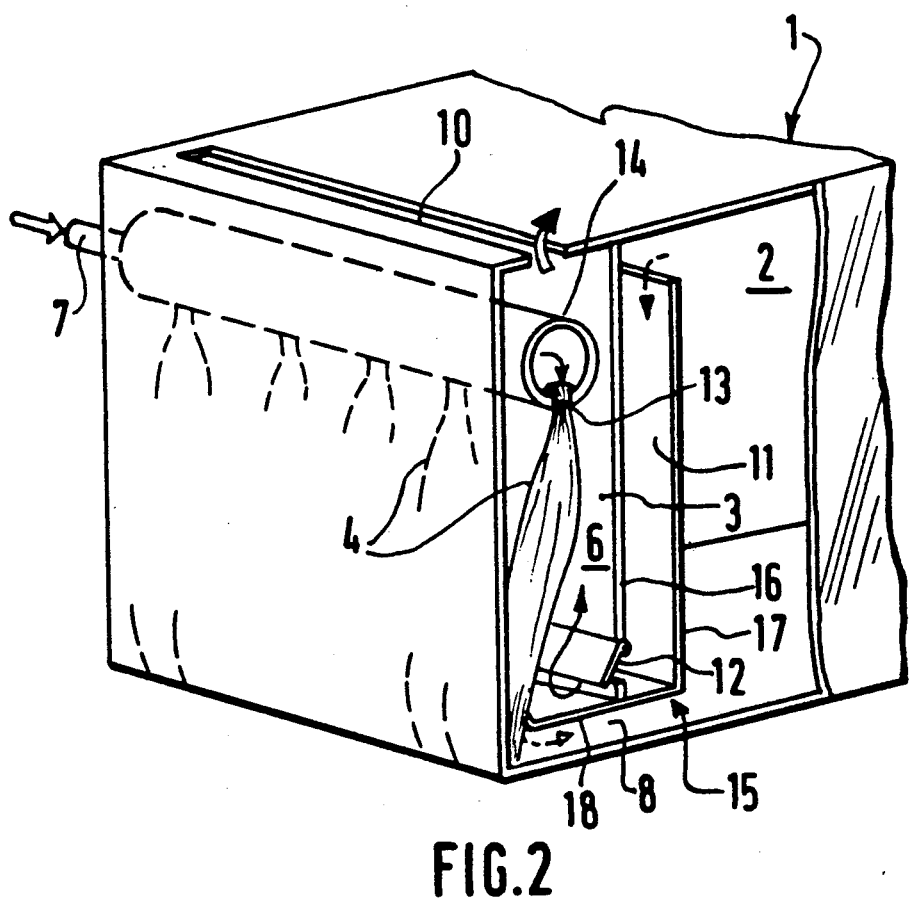
FIG. 2 is a fragmentary partial cross-section view of another embodiment of the invention.

FIG. 2 illustrates an embodiment wherein the first modified gaseous mixture is expanded by the membrane itself, which, for example, is made of a plurality of bundles of hollow fibers 4, for example of polyimide, each bundle of hollow fibers being inserted, through one of its ends, into an orifice 13 formed in a collector tube 14, for example of PVC or reinforced polyethylene, the imperviouness at the level of the orifices being obtained by the controlled application of epoxide resin (by dipping, brushing or injection under pressure via tube 14). Tube 14 and the bundles of fibers 4 are placed in a casing 15 mounted in the interior volume 2 of enclosure 1. Two partitions 16 and 17 of casing 15 which are parallel to one another respectively define a chamber 6 receiving the tube 14 and the bundles of fibers 4 and constituting the low pressure compartment of the module, and a chamber or a series of ducts 11 defining a communication between the upper part of the interior volume 2 and the bottom of chamber 6 via a pivoting flap constituting a trap valve 12. Tube 14 is placed in the upper part of chamber 6 and fibers 4 normally extend past a bottom 18 of casing 15 which defines with the bottom of enclosure 1, a duct 8 providing communication between the exit ends of fibers 4, ending in duct 4, and volume 2. The collector tube 14 is connected at an end of the enclosure to a connection 7 to a source of air under pressure, its other end being sealed. The upper partition of chamber 6 is provided with one or more openings 10 defining a discharge orifice towards the surrounding atmosphere of the permeation module.

According to a variant, in order to optimize the gaseous separation with the bundle of fibers 4, the partitions defining chamber 6 are arranged so that the transverse cross-section of the latter progressively decreases from top to bottom, i.e. from connector tube 14 to the lower narrowing duct receiving the free ends of the fibers.

It will be understood that according to embodiments, the length and the diameter of the hollow fibers 4, which interiorly define the high pressure compartment of the module, determine the composition of the first gaseous mixture produced for a given supply pressure, as well as the reduced pressure for delivering this first gaseous mixture, which enables to remove the sealed compartment under pressure on the production side of the first gaseous mixture which is normally found in traditional hollow fiber cartridges.

We claim:

1. A method of creating a controlled atmosphere within an enclosure by means of a permeation device having first and second compartments separated by a permeation membrane, comprising the steps of:
   introducing a first gas mixture of at least two gas components under pressure into the first compartment whereby one of said gas components permeates said membrane and enters said second compartment;
   withdrawing from the first compartment and introducing into the enclosure a gas mixture thus depleted in said one gas component, thereby displacing atmosphere from the enclosure through a discharge duct connected to the enclosure;
   introducing the displaced atmosphere from the discharge duct into the second compartment and mixing the same with said one gas component that has permeated said membrane thereby to produce a second gas mixture; and
   venting from the second compartment said second gas mixture.

2. The method of claim 1, further comprising the step of expanding said first gas mixture depleted of said one gas component before introduction into the enclosure.

3. The method of claim 2, wherein the permeation device is elongated and said first gas mixture enters the first compartment at one end of the permeation device, and introducing the deplaced atmosphere into the second compartment at the opposite end of the permeation device.

4. The method of claim 2, wherein the feed gas mixture is air and said one gas component is oxygen.

5. The method of claim 2, further comprising the step of maintaining the interior of the enclosure at a temperature different from the temperature of the feed gas mixture.

6. An apparatus comprising:
   an enclosure defining at least an inner volume and having a gas inlet duct and a gas outlet duct communicating with the inner volume;
   a permeation device having first and second compartments separated by a permeation membrane means, the first compartment having an inlet port connectable to a source of a first gas mixture of at least two components under pressure and an outlet port for discharging a gas mixture depleted in one of said gas components that is able to permeate said membrane means and enter said second compartment, the second compartment having an outlet port for discharging a second gas mixture, wherein the gas inlet duct is connected to the outlet port of the first compartment and wherein the second compartment has gas inlet means communicating with the gas outlet duct.

7. The apparatus of claim 6, wherein the gas inlet duct includes a pressure-reducing valve.

8. The apparatus of claim 7, wherein the permeation device is elongated and the inlet port of the first compartment and the outlet port of the second compartment are located at one end of the permeation device and the outlet port of the compartment is located at the opposite end of the permeation device, the gas inlet means of the second compartment being adjacent said opposite end of the permeation device.

9. The apparatus of claim 6, wherein the gas outlet duct includes a non-return valve means.

10. The apparatus of claim 6, wherein the permeation device is arranged with a chamber in the enclosure, communicating with the inner volume via an inner passage forming the gas inlet duct.

11. The apparatus of claim 10, wherein the permeation membrane means is formed of at least a bundle of permeation fibers extending into the chamber and terminating in the inner passage.

12. The apparatus of claim 11, wherein the permeation fibers depend from an inlet collector extending into the chamber which forms part of the second compartment.

13. Apparatus for creating a controlled atmosphere within an enclosure by means of a permeation device having first and second compartments separated by a permeation membrane, the apparatus comprising:

means for introducing a first gas mixture of at least two gas components under pressure into the first compartment whereby one of said gas components permeates said membrane and enters said second compartment;

means for withdrawing from the first compartment and introducing into the enclosure a gas mixture thus depleted in said one gas component, thereby displacing atmosphere from the enclosure through a discharge duct connected to the enclosure;

means for introducing the displaced atmosphere from the discharge duct into the second compartment and for mixing the same with said one component that has permeated said membrane thereby to produce a second gas mixture; and means for venting from the second compartment said second gas mixture.

* * * * *